United States Patent
Heap et al.

(10) Patent No.: US 7,691,026 B2
(45) Date of Patent: Apr. 6, 2010

(54) CONTROL ARCHITECTURE FOR OPTIMIZATION AND CONTROL OF A HYBRID POWERTRAIN SYSTEM

(75) Inventors: Anthony H. Heap, Ann Arbor, MI (US); William R. Cawthorne, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 642 days.

(21) Appl. No.: 11/561,140

(22) Filed: Nov. 17, 2006

(65) Prior Publication Data

US 2008/0120000 A1    May 22, 2008

(51) Int. Cl.
*B60W 10/04* (2006.01)
*B60W 10/10* (2006.01)

(52) U.S. Cl. .......................................... 477/3; 903/930

(58) Field of Classification Search .................. 477/3
See application file for complete search history.

(56) References Cited

U.S. PATENT DOCUMENTS

2006/0289212 A1* 12/2006 Haruhisa ................. 180/65.2

* cited by examiner

*Primary Examiner*—Sherry L Estremsky
*Assistant Examiner*—Edwin A. Young

(57) ABSTRACT

There is provided a control system for a powertrain system including an electro-mechanical transmission that is selectively operative in a plurality of fixed gear modes and continuously variable modes. The control system is adapted to execute the following steps in the sequence set forth as follows. A preferred operating range state is selected. A shift and an engine start/stop operation are selectively executed to achieve the preferred operating range state. A commanded input torque from the internal combustion engine is determined. Commanded output torques of the first and second electrical machines are determined.

12 Claims, 3 Drawing Sheets

US 7,691,026 B2

CONTROL ARCHITECTURE FOR OPTIMIZATION AND CONTROL OF A HYBRID POWERTRAIN SYSTEM

TECHNICAL FIELD

This invention pertains generally to control systems for powertrain control systems employing electro-mechanical transmissions.

BACKGROUND OF THE INVENTION

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit.

Engineers implementing powertrain systems having electro-mechanical transmissions are tasked with implementing control schemes to effectively monitor system states and control operation of various systems and actuators to effectively control powertrain operation. Such a system is described hereinafter.

SUMMARY OF THE INVENTION

In accordance with an embodiment of the invention, a method for controlling a powertrain is provided. The powertrain comprises an internal combustion engine and first and second electrical machines and an electro-mechanical transmission selectively operative to transmit torque therebetween and is selectively operative in one of a plurality of operating range states. The method comprises the following steps in the sequence set forth. A preferred operating range state is first selected. Then, a transmission gear shift and an engine start/stop operation are selectively executed to achieve the preferred operating range state. Then, an input torque is determined from the internal combustion engine and an actual operating range state. Then commanded motor torques are determined for the first and second electrical machines.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
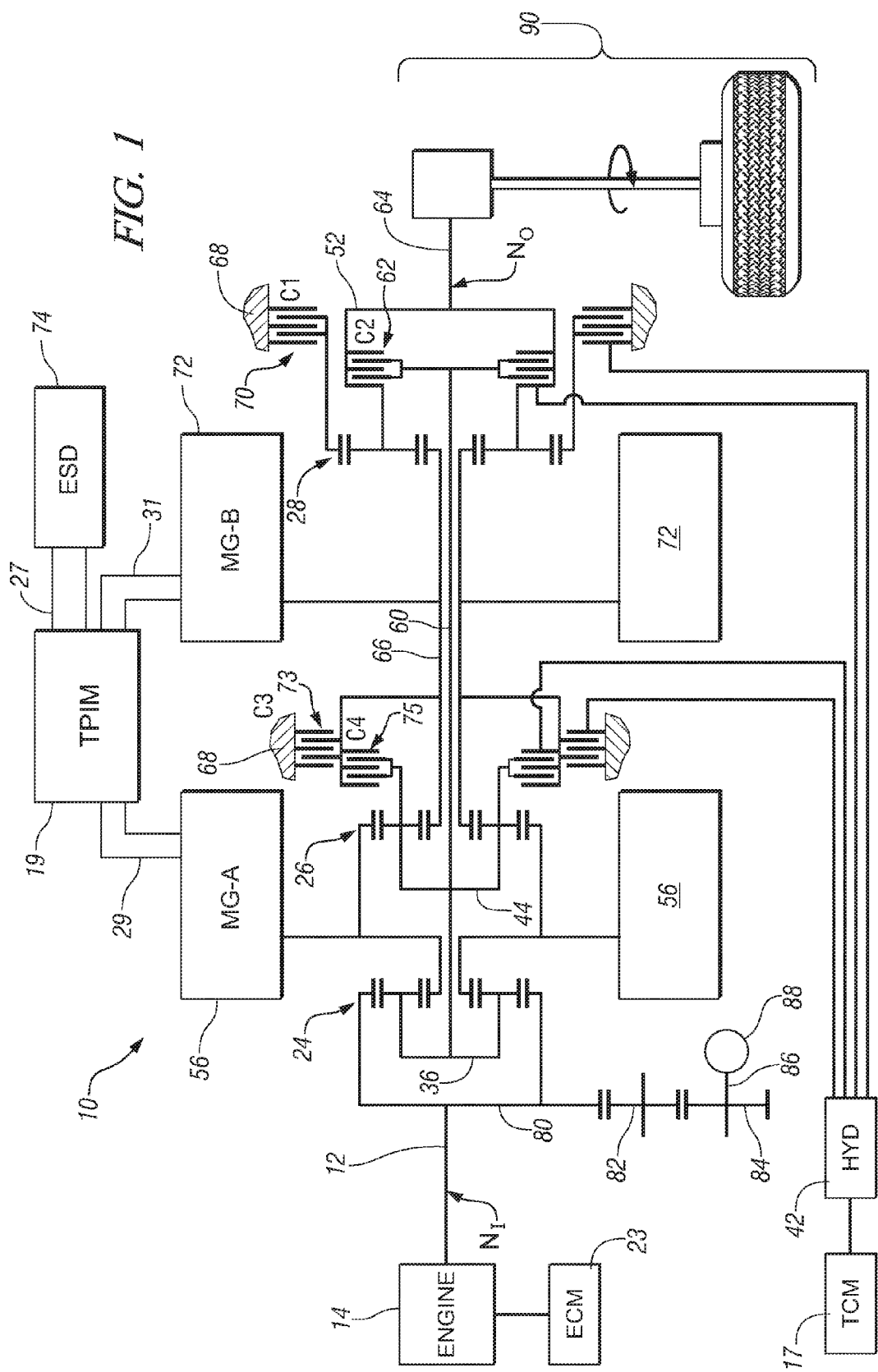
FIG. 1 is a schematic diagram of an exemplary powertrain, in accordance with the present invention.
Figure 2:
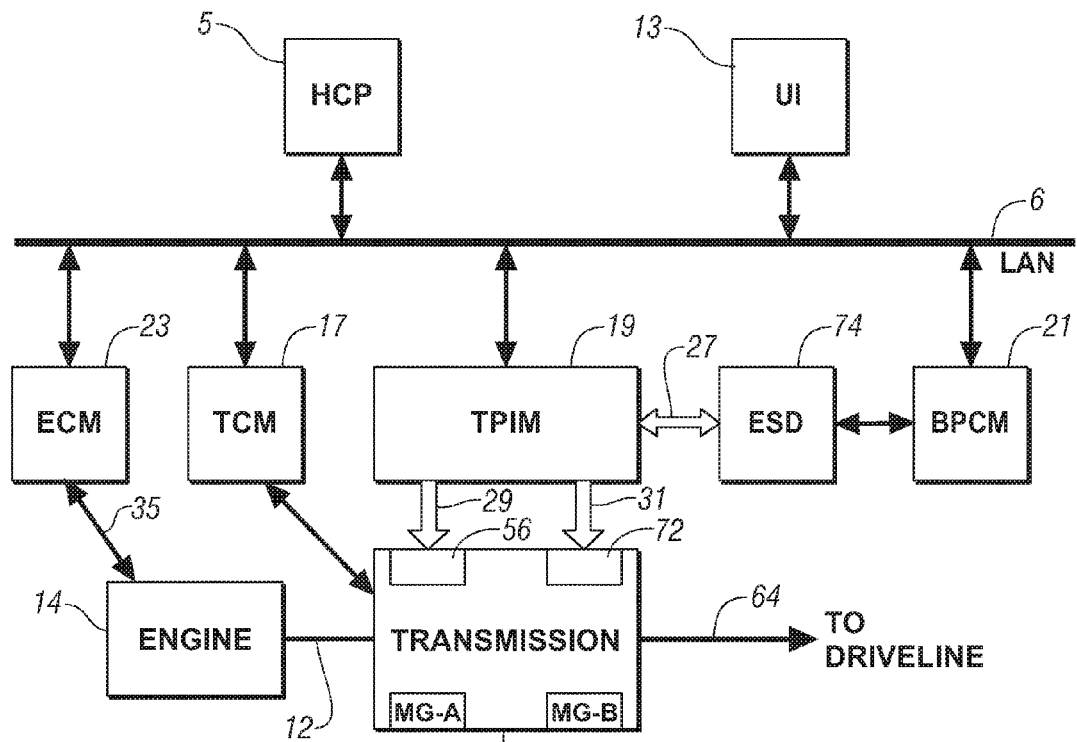
FIG. 2 is a schematic diagram of an exemplary architecture for a control system and powertrain, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 includes an input shaft 12 having an input speed, $N_I$ that is preferably driven by the internal combustion engine 14. The engine 14 has a crankshaft having characteristic speed $N_E$ which is operatively connected to the transmission input shaft 12. When a clutch device (not shown) operatively connects the engine and transmission, the engine speed $N_E$ and output torque $T_E$ can differ from transmission input speed $N_I$ and input torque $T_I$.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, referred to as MG-A.

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64, which has an output rotational speed, $N_O$. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A 56 and MG-B 72 are coaxially oriented, as about the axially disposed shaft 60. MG-A and MG-B are both of an annular configuration which permits them to circumscribe the three planetary gear sets 24, 26 and 28 such that the planetary gear sets 24, 26 and 28 are disposed radially inwardly of MG-A and MG-B. Transmission output member 64 is operably connected to a vehicle driveline 90 to provide motive output torque, $T_O$ vehicle wheels. Each clutch is preferably hydraulically actuated, receiving pressurized hydraulic fluid from a pump, described below, via an electro-hydraulic control circuit 42.

The transmission 10 receives input torque from the torque-generative devices, including the engine 14 and the MG-A 56 and MG-B 72, and referred to as '$T_I$', '$T_A$', and '$T_B$' respectively, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to TPIM 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e., MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request ('$T_{O\_REQ}$') output to driveline 90, the input torque $T_I$ originating from the engine, clutch torque, ('$T_{CL\_N}$') for the N various torque-transfer clutches C1, C2, C3, C4 of the transmission 10; and motor input torques $T_A$ and $T_B$ for MG-A and MG-B. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_EST\_N}$) for each of the N clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The TPIM 19 includes previously referenced power inverters and motor control modules configured to receive motor control commands and control inverter states therefrom to provide motor drive or regeneration functionality. The TPIM 19 is operable to generate the motor torque commands for MG-A 56 and MG-B 72, i.e., $T_A$ and $T_B$, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The exemplary two-mode, compound-split, electro-mechanical transmission operates in several operating range states, comprising fixed gear operating modes and continuously variable operating modes with the engine on and off, described with reference to FIG. 1, and Table 1, below.

TABLE 1

| Operating Range State | Actuated Clutches | |
|---|---|---|
| Mode I - Engine Off (M1_Eng_Off) | C1 70 | |
| Mode I - Engine On (M1_Eng_On) | C1 70 | |
| Fixed Ratio 1 (GR1) | C1 70 | C4 75 |
| Fixed Ratio 2 (GR2) | C1 70 | C2 62 |
| Mode II - Engine Off (M2_Eng_Off) | C2 62 | |
| Mode II - Engine On (M2_Eng_On) | C2 62 | |
| Fixed Ratio 3 (GR3) | C2 62 | C4 75 |
| Fixed Ratio 4 (GR4) | C2 62 | C3 73 |

The various operating range states described in the table indicate which of the specific clutches C1, C2, C3, and C4 are engaged or actuated for each of the operating range states. Additionally, in various transmission operating range states, MG-A and MG-B may each operate as electrical motors to generate motive torque, or as a generator to generate electrical energy. A first mode, i.e., Mode I, is selected when clutch C1 70 is actuated in order to "ground" the outer gear member of the third planetary gear set 28. The engine 14 can be either on or off. A second mode, i.e., Mode II, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating. Other factors outside the scope of the invention affect when the electrical machines 56, 72 operate as motors and generators, and are not discussed herein.

The control system, shown primarily in FIG. 2, is operable to provide a range of transmission output speeds at shaft 64 from relatively slow to relatively fast within each operating range state. The combination of two modes with a slow-to-fast output speed range in each range state allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e., either clutch C1 62 or C2 70, and by the controlled speed and torque of the electrical machines 56 and 72, which can be referred to as a continuously variable transmission mode. Certain ranges of operation are described below in which fixed gear ratios are achieved by applying an additional clutch. This additional clutch may be clutch C3 73 or C4 75, as shown in the table, above.

When the additional clutch is applied, fixed ratio operation of input-to-output speed of the transmission, i.e., $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio GR1 that motive power output from the transmission at shaft 64 is provided by power from the engine and power from MG-A and MG-B, through planetary gear set 28 by transmitting electrical power from ESD 74.

Figure 3:
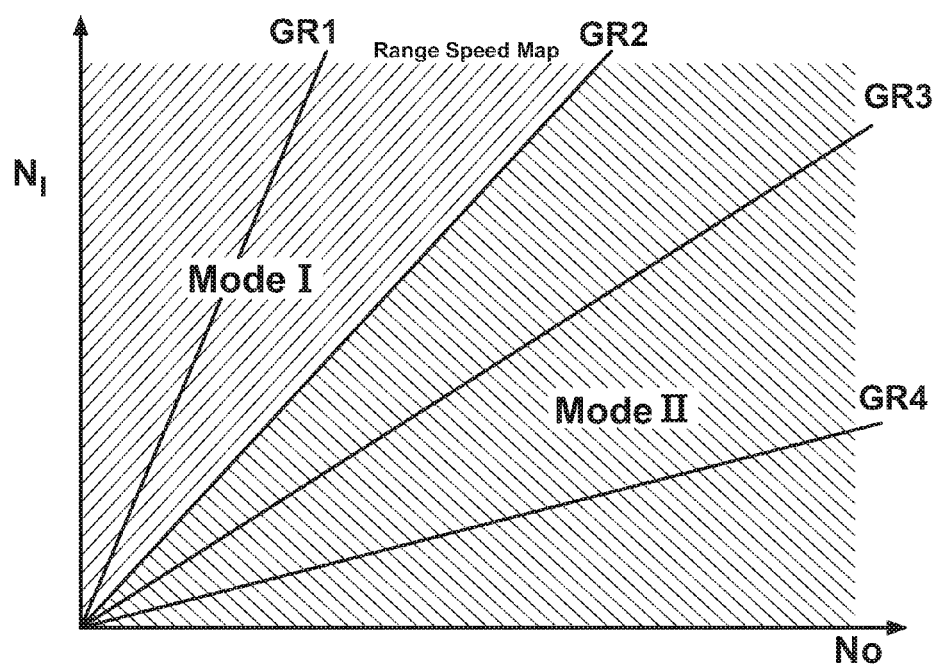
FIG. 3 is a graphical depiction, in accordance with the present invention.

Referring now to FIG. 3, various transmission operating modes are plotted as a function of transmission output speed, $N_O$, and, input speed, $N_I$ for the exemplary powertrain control system shown in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode I and Mode II. The transmission operating range state is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention. Selection of the operating range state of the transmission depends primarily on operator torque request, $T_{O\_REQ}$ and the ability of the powertrain to meet that operator torque request.

Referring to Table 1 and again to FIG. 3, the low range operating state includes selective actuation of clutches C2, C1, and C4, facilitating operation in any one of continuously variable Mode I, and fixed gears GR1, GR2, and GR3. The high range operating state includes selective actuation of clutches C2, C3, and C4, facilitating operation in any one of continuously variable Mode II and fixed gears GR3 and GR4. It should be recognized that ranges of continuously variable operation for Mode I and Mode II may overlap.

In response to an operator's action, as captured by the UI 13, the supervisory HCP control module 5 and one or more of the other control modules determine the operator torque request $T_{O\_REQ}$, at shaft 64. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque which affects how and when the vehicle accelerates or decelerates.

Final vehicle acceleration is affected by other factors, including, e.g., road load, road grade, and vehicle mass. The operating mode is determined for the exemplary transmission based upon a variety of operating characteristics of the powertrain. This includes demand for an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

Figure 4:
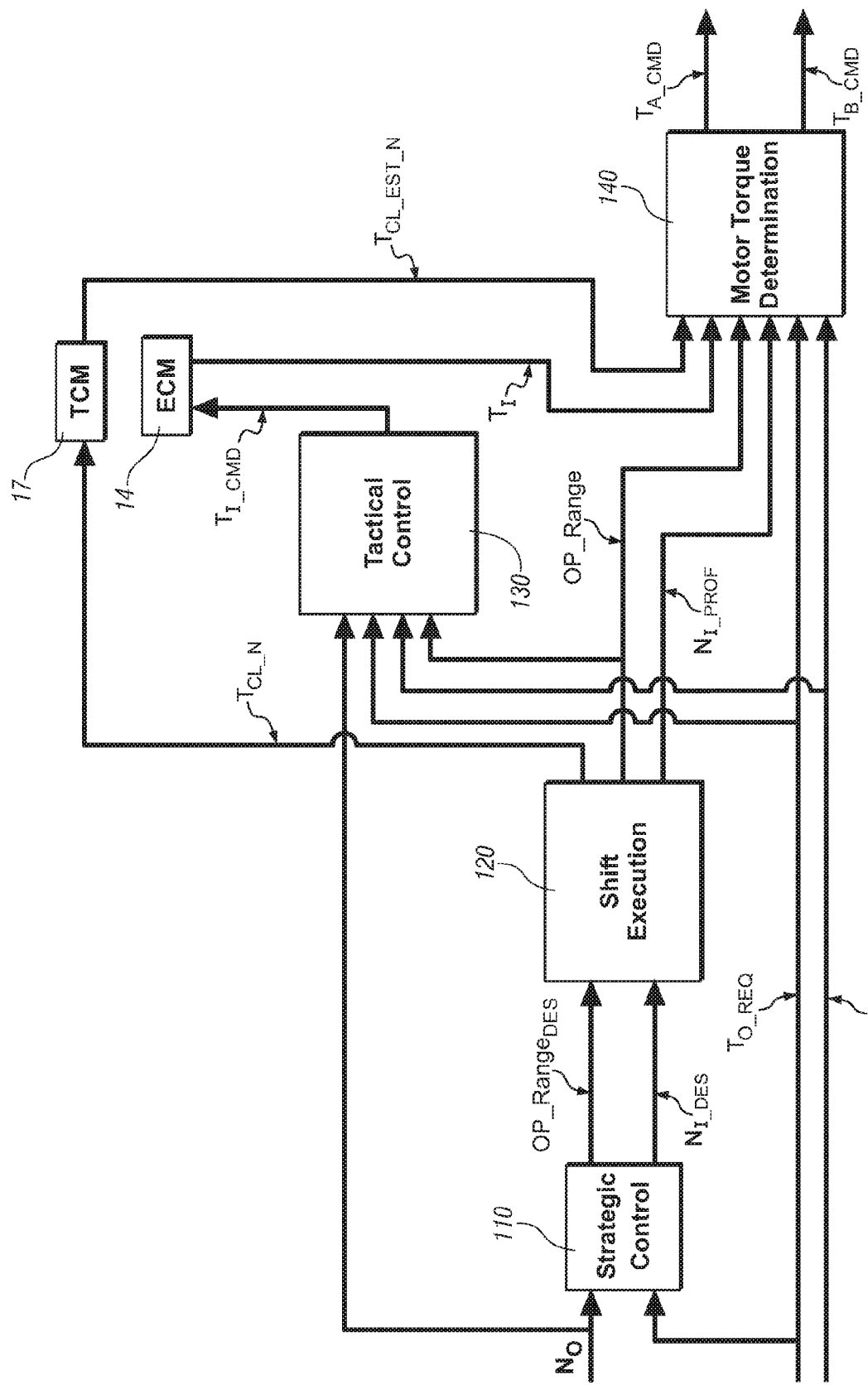
FIG. 4 is a parametric flow diagram, in accordance with the present invention.

Referring now to FIG. 4, a preferred method of operating the exemplary powertrain system described with reference to FIGS. 1, 2, and 3 is now described. The method comprises the following steps in the sequence set forth.

First, in strategic control (Block 110), a preferred or desired operating range state ($Op\_Range_{DES}$) is selected based primarily upon output speed, $N_O$ of shaft 64 and the operator torque request, $T_{O\_REQ}$. The selected preferred operating range state comprises one of the transmission operating modes described with reference to Table 1 for the exemplary transmission, including fixed gear modes GR1, GR2, GR3, and GR4, and continuously variable Modes I and II, which are coupled with the engine 14 requested on or off, i.e., not rotating. Furthermore, when requesting operation in Mode I or Mode II, a preferred or desired input speed is determined. The strategic control is preferably executed by the HCP 5 during each 100 ms loop cycle and each 25 ms loop cycle. Output of the strategic control includes the preferred or desired operating range state ('$Op\_Range_{DES}$') and desired input speed ('$N_{I\_DES}$') each which are input to a shift execution control block 120.

The shift execution control block (Block 120) is executed, preferably by the HCP 5, to selectively execute a shift and selectively perform an engine start/stop operation to achieve the preferred operating range state ('$Op\_Range_{DES}$') described in Block 110. This includes the HCP determining and communicating a plurality of clutch torque commands, $T_{CL\_N}$, one for each of the N torque transfer clutches C1, C2, C3, C4 to the TCM 17 to actuate selected torque-transfer clutches and deactivate other selected torque-transfer clutches based upon the preferred operating range state. The HCP also determines and outputs the current actual operating range state ('Op_Range') of the transmission 10, which may vary from the desired operating range due to execution times and other reasons. The HCP executes commands to start or stop rotation of the internal combustion engine 14, depending upon the desired operating range state ('$Op\_Range_{DES}$'). This action includes the HCP communicating a plurality of engine operating commands effective to control and manage air flow, fuel, and, spark energy and timing (in a spark ignition engine) in accordance with the desired operating mode to achieve the desired input speed, $N_{I\_DES}$. An output of the shift execution block 120 includes an input speed profile, $N_{I\_PROF}$, which preferably comprises a scalar parametric value that is a targeted input speed for the forthcoming loop cycle, based upon the engine operating commands and the operator torque request, $T_{O\_REQ}$. The shift execution control block (Block 120) is preferably executed by the HCP 5 during each 25 ms loop cycle.

Subsequently, the tactical control block (block 130) is executed to determine the input torque commanded from the internal combustion engine, $T_{I\_CMD}$, preferably by the HCP, and preferably during every 25 ms loop cycle. Inputs to the tactical control block preferably comprise the transmission output speed, $N_o$, the input speed, $N_I$, the operator torque request, $T_{O\_REQ}$, and the current operating range state ('Op_Range') of the transmission as determined previously in Block 120. The input torque commanded or requested from the internal combustion engine, $T_{I\_CMD}$ is communicated from the HCP to the ECM 14 for execution therein. Controlling the input torque from the internal combustion engine comprises controlling operation of the engine to a preferred load operating point to achieve the input torque $T_I$ preferably without violating other operating conditions and requirements, including those related to driveability, fuel economy, and emissions.

Subsequently, commanded output torques of the first and second electrical machines, $T_{A\_CMD}$ and $T_{B\_CMD}$, are determined in the motor torque determination block (Block 140). The commanded output torques of the first and second electrical machines are determined based upon input speed, $N_I$, and the targeted input speed $N_{I\_PROF}$, current input torque $T_I$, from the ECM, the operator torque request $T_{O\_REQ}$, and the current operating range state, and the torque transmitted by the selectively actuated torque-transfer clutches as estimated by the TCM, $T_{CL\_EST\_N}$. The commanded output torques of the first and second electrical machines, $T_{A\_CMD}$ and $T_{B\_CMD}$, are determined based upon an allowable range of output torques of the electrical machines determinable based upon other operating characteristics including, e.g., battery or system voltage. The commanded output torques, $T_{A\_CMD}$ and $T_{B\_CMD}$ include considerations of motive torque generation or electrical energy generation. The commanded output torques of the first and second electrical machines are determined by the HCP every 12.5 ms loop cycle and communicated from the HCP to the TPIM 27 for execution.

The order of execution of the steps described herein includes determining the preferred operating range state based upon operating conditions. Actuating the clutches and engine start/stop operation takes an elapsed time in the order of 250 to 500 milliseconds. Commanding and executing a change in input torque from the engine takes an elapsed time in the order of 50-100 milliseconds. Commanding and executing a change in output torques from the electrical motors takes an elapsed time in the order of less than 50 milliseconds. This strategy effects controlled rapid transitions in output torque, To, in response to the operator torque request $T_{O\_REQ}$, while taking into account and compensating for a range of response times of the various actuators and torque-generative devices of the powertrain. The strategy further takes into account need to provide torque damping to minimize driveline disturbances. As each of the steps are executed in the sequence set forth hereinabove, additional real-time parametric feedback data is used to calculate outputs from the shift execution 120, tactical control 130, and motor torque determination 140. This provides a more accurate determination of motor torque commands, leading to more efficient operation of the system and utilization of resources and energy, and smoother, lower vibration operation.

It is understood that modifications are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. A method for controlling a powertrain comprising an internal combustion engine and first and second electrical machines and an electro-mechanical transmission selectively operative in one of a plurality of operating range states to transmit torque therebetween, the method comprising the following steps in the sequence set forth:

first, selecting a preferred operating range state; then, selectively executing a transmission gear shift and an engine start/stop operation to achieve the preferred operating range state; then, determining an input torque from the internal combustion engine and an actual operating range state; and, then, determining commanded motor torques for the first and second electrical machines.

2. The method of claim 1, wherein the operating range state comprises operating the transmission in one of two continuously variable modes.

3. The method of claim 2, wherein the operating range state further comprises operating the transmission in one of four fixed gear modes.

4. The method of claim 3, wherein selectively operating the transmission in one of two continuously variable modes and four fixed gear modes comprises selectively actuating a plurality of torque-transfer clutches.

5. The method of claim 3, wherein the operating range state further comprises one of the internal combustion engine on and off during operation of the powertrain in each of the two continuously variable modes.

6. The method of claim 5, wherein the internal combustion engine being off comprises rotation of a crankshaft of the engine being substantially stopped.

7. The method of claim 1, wherein the preferred operating range state is selected based upon an output of the transmission and an operator torque request.

8. The method of claim 1, wherein selectively executing a shift and an engine start/stop operation to achieve the preferred operating range state comprises actuating selected ones of torque-transfer clutches and deactivating selected ones of the torque-transfer clutches based upon the preferred operating range state and a desired input speed from the engine.

9. The method of claim 8, further comprising determining a targeted input speed based upon the desired operating range state and the desired input speed from the engine.

10. The method of claim 1, wherein the input torque from the internal combustion engine is determined based upon a transmission output speed, a transmission input speed, an operator torque request, and a current operating range state of the transmission.

11. The method of claim 10, wherein the input torque from the internal combustion engine is achieved by controlling operation of the engine to a preferred load operating point.

12. The method of claim 1, wherein the commanded output torques of the first and second electrical machines are determined based upon a transmission input speed and a targeted input speed, an input torque, an operator torque request, a current operating range state, and torque transmitted by the selectively actuated torque-transfer clutches.

* * * * *